United States Patent
Waupotitsch et al.

(10) Patent No.: US 7,242,807 B2
(45) Date of Patent: Jul. 10, 2007

(54) IMAGING OF BIOMETRIC INFORMATION BASED ON THREE-DIMENSIONAL SHAPES

(75) Inventors: Roman Waupotitsch, San Jose, CA (US); Mikhail Tsoupko-Sitnikov, Campbell, CA (US); Gerard Medioni, Los Angeles, CA (US)

(73) Assignee: Fish & Richardson P.C., San Diego, CA (US)

( * ) Notice: Subject to any disclaimer, the term of this patent is extended or adjusted under 35 U.S.C. 154(b) by 606 days.

(21) Appl. No.: 10/430,354

(22) Filed: May 5, 2003

(65) Prior Publication Data

US 2004/0223630 A1    Nov. 11, 2004

(51) Int. Cl.
G06K 9/62 (2006.01)
G06K 9/00 (2006.01)
(52) U.S. Cl. .................. 382/209; 382/118; 382/154
(58) Field of Classification Search .............. 382/209
See application file for complete search history.

(56) References Cited

U.S. PATENT DOCUMENTS

| | | | |
|---|---|---|---|
| 6,381,346 B1 * | 4/2002 | Eraslan ............. | 382/118 |
| 6,665,446 B1 * | 12/2003 | Kato ............. | 382/251 |
| 6,751,340 B2 * | 6/2004 | Prokoski ............. | 382/118 |
| 7,020,305 B2 * | 3/2006 | Liu et al. ............. | 382/107 |
| 2002/0034319 A1 * | 3/2002 | Tumey et al. ............. | 382/116 |
| 2002/0150280 A1 * | 10/2002 | Li ............. | 382/117 |
| 2003/0123713 A1 * | 7/2003 | Geng ............. | 382/118 |
| 2003/0169906 A1 * | 9/2003 | Gokturk et al. ............. | 382/115 |
| 2004/0076313 A1 * | 4/2004 | Bronstein et al. ............. | 382/118 |
| 2004/0223631 A1 | 11/2004 | Waupotitsch et al. | |
| 2005/0111705 A1 | 5/2005 | Waupotitsch et al. | |
| 2005/0226509 A1 | 10/2005 | Maurer et al. | |

\* cited by examiner

*Primary Examiner*—Joseph Mancuso
*Assistant Examiner*—Kathleen Yuan

(57) ABSTRACT

A device for carrying out of biometric identification by comparing face shapes. The shape of a first face is compared with the shape of a second face. A map can be determined between the shapes. The shape, and hence the comparison, is substantially independent of pose and lighting, and also parts of the shape can be removed from the comparison in order to enhance the recognition.

1 Claim, 2 Drawing Sheets

IMAGING OF BIOMETRIC INFORMATION BASED ON THREE-DIMENSIONAL SHAPES

BACKGROUND

A biometric is a measurement of any physical characteristic or personal trait of an individual that can be used to identify or verify the identity of that individual. Different forms of biometrics are well known and have been extensively tested. Common forms of biometrics include fingerprint, voice, eye scan (for example retinal scan and iris scan) face recognition, and others. Most biometric systems operate by initially enrolling individuals; that is collecting biometric samples from persons and using those samples to generate a template. The template is the data that represents the enrollee's biometric. The biometric system then matches new samples against the templates, and either verifies or identifies based on this matching.

Retinal scans and iris scans are extremely accurate, but may be considered intrusive by many people, since the scanner actually looks into the users eye. Moreover, the scan may require the user to cooperate, that is, it may require the user to look into the scanner in a certain way.

Fingerprint scans are also intrusive in that they require the user to put their hand into a fingerprint scanning device. In addition, the fingerprint scans often will not work on certain people who work with their hands (such as construction workers, and the like), and suffer from difficulties based on the actual orientation of the fingerprint. Moreover, if a user fails a fingerprint scan, there is no easy way to verify whether the user really should have failed that scan or not. Only highly trained individuals can manually match fingerprints. Finally, fingerprints require cooperation even more than retinal scans.

Face recognition has certain advantages in this regard. Initially, face recognition is not intrusive, since the face can be obtained by a simple camera, without requiring the user to do anything, other than walk by a location, and have their face captured by a camera. Similarly, face recognition does not require cooperation. Other face recognition systems may use lasers. While these latter techniques may be more intrusive, they are still no more intrusive than other technologies and do not require cooperation.

In addition, the human brain is extremely good at recognizing faces. An alarm allows a person to determine at a glance whether the face is correct or not.

The state-of-the-art in face recognition includes devices which are marketed by Viisage and Identix. These devices typically compare two-dimensional pictures of faces, against a two-dimensional template of another picture, which is stored in memory. The problem is that the comparison is intended to be a comparison of FACES, but the real comparison is a comparison of PICTURES OF FACES. Therefore, the comparison is highly affected by lighting, pose of the person, and other variances.

SUMMARY

The present invention uses three-dimensional mask data created from a user' face for biometric recognition and verification. According to an embodiment, the system translates the acquired 3-D datainformation into a mask shape. The shape can be a three-dimensional shape indicative of the shape of the face being imaged. The face shape is then compared to other face shapes. A decision is made based on the similarity between the 3-D shapes.

BRIEF DESCRIPTION OF THE DRAWINGS

These and other aspects will now be described in detail with reference to the accompanying drawings, wherein.

DETAILED DESCRIPTION

The present application teaches biometric operations based on 3-D data about the shape of a face. Face shape, because it is three dimensional, can accomodate pose differences, and also is independent of lighting, which affects the visual appearance only. The comparison therefore compares shapes, instead of comparing pictures. The technique operates by comparing 3-D "masks", indicative of the faces, and determining differences between the masks.

Figure 1:
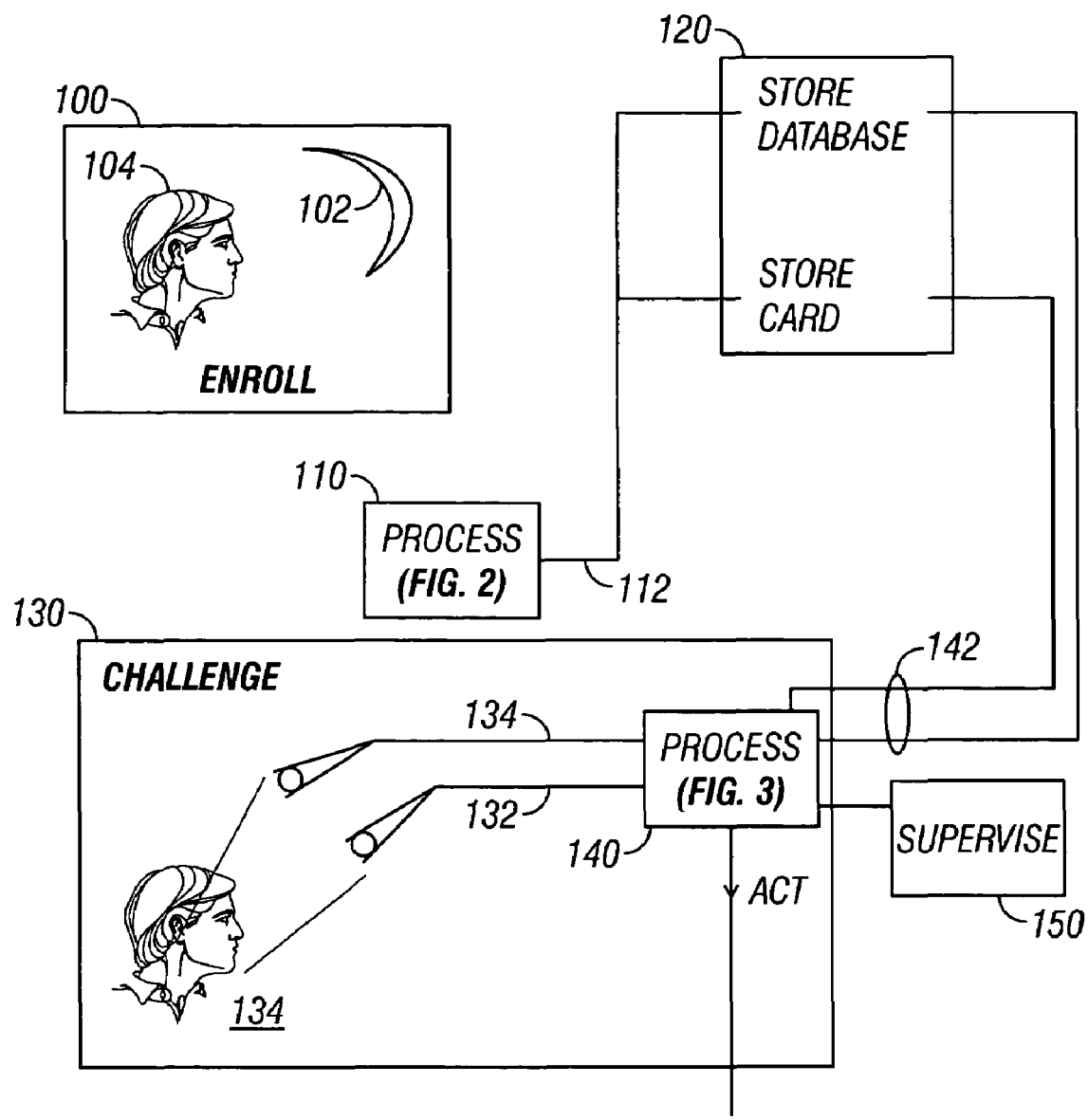
FIG. 1 shows a block diagram of the hardware system.

A block diagram of the overall system as described is shown in FIG. 1. An initial operation carries out enrollment shown as block 100. The enrollment system includes a stereo camera 102, which obtains a picture of the user 104. The stereo camera may acquire three-dimensional information.

Enrollment may also consist of a laser range finder, or a projected pattern, or any of a variety of devices which produce 3-D data as output.

Figure 2:
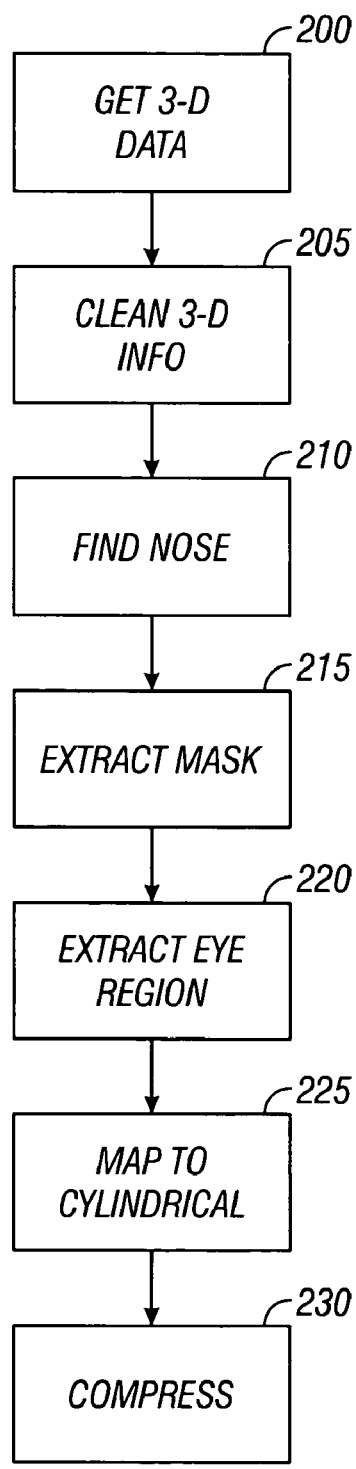
FIG. 2 shows a flowchart of the enrollment system.

A processor 110 processes the 3-D data as explained herein with reference to the flowchart of FIG. 2. The final output from the processor 112 is a template which represents the shape of a user's face, as individual biometric characteristics of the user 104. This template is stored in infrastructure 120 which may be a remote database accessible over the Internet for example, or may be a local card. For example, in one embodiment, the enrollment information may be reduced to a size as low as 10 to 20 kB. This size is sufficiently small to allow storage in a smart card, or the like. The smart card can include encryption for example.

The challenge is carried out in the challenge device 130. Note that the system may be used either for confirming identities, in the case for example where the challenge is used as part of user identification confirmation, or for determining identities; for example comparing users who pass a certain point against a list of persons who are being looked for (to find a face in the crowd).

The challenge also includes a 3-D camera array 132 which acquires shape information about the user 134 who may or may not be the same as user 104. Note that the 3-D camera may be a laser range finder, or a projected pattern whose distortion is measured, or any of a variety of devices which produce 3-D data as output. The acquired 3-D data 134 is processed by a processor 140 which operates as explained with reference to the flowchart of FIG. 3. The processor 140 receives as input the stored template 142. The template 142 may be received as encrypted information indicative of the template.

A supervisory block 150 may be optional, and may provide a television monitor for a supervisor to visually review any cases which are identified as alarms. When the challenge block rejects a person's identity, the supervisor may visually evaluate this rejection. Conversely, in the case where the system detects certain identities, (such as most wanted lists and the like), the supervisor may visually confirm those detections.

As described above, the process of enrollment is shown in the flowchart of FIG. 2. This may be carried out in a dedicated processor that runs the flowchart, or alternatively may be carried out in firmware or in any other kind of hardwired device.

A flowchart of the enrollment is shown in FIG. 2. 200 represents obtaining the data for the 3-D image This can be as simple as simply obtaining two different calibrated pictures from slightly different angles, and converting the pictures into a depth map.

At 205, the three-dimensional information is cleaned. The cleaning of the information may include removing the background, and removing certain types of noise caused by small artifacts of the acquisition device, hair and clothing. First, triangles that are too large (larger than certain threshold above the median triangle size) and too oblique (defined by the angle between the normal to the triangle and the view direction) are eliminated.

After that, a sequence of morphological operations is carried out to ensure that only the "central" component of the face mesh is left.

Spiking noise represents parts of the image, which has a very high frequency, such as hair and other small objects. These can also be removed by simply averaging them at a palette level of the depth map. Spiking noise may be caused by things like errors in the stereographic taking of the picture, from hair, and the like.

At 210, the system finds a known part of the shape representation of the mesh, here the tip of the nose. The nose is approximately in the center of the image from which the mesh is computed. In a front view, the tip of the nose is defined as the closest point of the mesh corresponding to the face to the camera, and then verifying that it is in fact the correct peak. For example, depending on the position of the user's head, the furthest jutting peak could be the chin. It is important to verify that the peak being selected is in fact the correct peak.

Once obtaining the 3D coordinates of the nose tip in the mesh, the corresponding 3-D point can be back projected onto the image coordinates. However, sometimes, the tip of the nose may not be the closest point, because of the hair, or the chin, or the pose of the head. So, a list of possible nose tips is selected. The nose is detected by moving a plane from the image plane of the camera towards the face mesh until the plane hits a vertex. The plane moves in the direction of the camera optical axis until it touches the mesh. The plane may be tilted at an angle theta of, approximately 7°, (e.g. between 4° and 10°) to avoid a pronounced chin getting in the way.

Any items touched by the plane become points that are potential nose tips.

Based on the position of the nose, and the assumption that the head is facing upward, 215 operates to extract a mesh that surrounds the nose and covers a large portion of the user's head. This is the mask that goes around the face, and preferably does not extend back to the hair. It may include ears and other head parts.

At 220, the system extracts the eye regions. This is done because eyes are typically not captured well in this kind of system, and also the eyes can move. This may use, for example, an eye detector of the type that is known in the literature, or the following.

The inventors noticed, from analysis of a database of over 100 faces, that the distance between the tip of the nose and each eye is very close to being constant. Using this knowledge, the tip of the nose tells a lot about the locations of the eyes.

Using the distance nose-eye that we defined from the face database, a window in the image is defined which contains the eyes for each nose candidate location in the list.

It is known that an eye contains a black area (the pupil) flanked by two white areas. Therefore, we threshold the previous image in two different ways to obtain the pupil, and the white areas.

Candidate for eyes are selected among the black connected components. An eye is the center of mass of the connected component, which is surrounded by two white areas. This constraint allows removing the outlines which remain after thresholding the pupil image.

For each triplet (nose—left eye—right eye), we define a score regarding the symmetry of the points, and the area of the connected components. At the end, we select the triplet, which has the best score.

The eye section is then removed, and also this sets the correct position of the nose tip.

What remains is the mask, minus the eye region. This is mapped to cylindrical coordinates at 225 in a cylindrical coordinate system, so that each point is effectively defined in terms of its position along the axis, its angle and radius.

At 230, the final data is compressed. This may use a lossless compression system such as LZW. It is desirable to retain between 9 and 11 bits of resolution, which is about the same resolution that would be obtained from the dense stereo acquisition.

This completes the enrollment stage, by forming the template.

The final template may be other size of 15 to 20 kB. This template is then used for recognition and verification.

Figure 3:
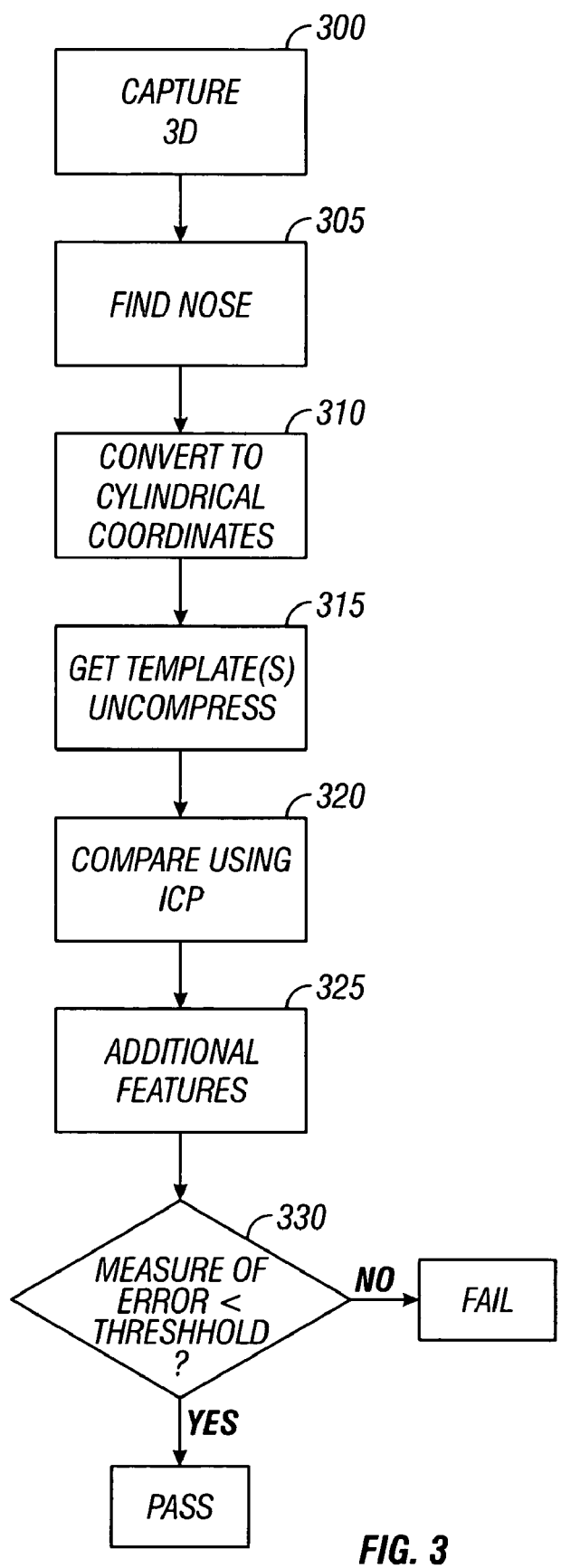
FIG. 3 shows a flowchart of the detection system.

A flowchart of the challenge operation is shown in FIG. 3. At 300, the system captures 3-D information. This may be done in a number of different ways, the easiest of which may include a stereo camera. However, the 3-D information can be captured in any other way, including using lasers and the like.

At 305, the system finds the nose in the captured 3-D information, using similar operations to 210 mentioned above. The eyes are removed as above, and the final information is converted to cylindrical coordinates at 310, which provides effectively a 3-D shape which is encoded in a similar form to the different templates obtained in the FIG. 2 flowchart.

At 315, the system gets the template or templates and decompresses them. If the system is verifying identity, it may only get one template. If the system is looking for one of a number of different persons, then multiple templates may be obtained. The uncompressed template is compared with the obtained mask. The comparison may take very many different forms, but in an embodiment, this may use the iterative closest point technique, or ICP. ICP is a standard way of comparing two different surfaces and measuring the errors between the surfaces, and is described in:

P. J. Besl and N. D. McKay, A method for registration of 3-d shapes. PAMI, 14(2): 239–256, February 1992. (online at http://www.engineering.uiowa.edu/~aip/Lectures/besl ICT 91. pdf), or Yang Chen and Gerard Medioni, "Object modelling by registration of multiple range images," Image and Vision Computing, vol. 10, no. 3, pp. 145–155, April 1992.

Besl and McKay 1992 introduced the Iterative Closest Point (ICP) algorithm to register two sets of points on a free-form surface. ICP is a 'general-purpose, representation-independent method for the accurate and computationally efficient registration of 3-D shapes including free-form curves and surfaces'. Extensions of this algorithm are now widely used for registration of multiple sets of surface data. The original algorithm registers two point sets provided one is a subset of the other and that the transform between the sets is approximately known. The original ICP algorithm operates as follows:

given point set P and surface Q where P is a subset of Q:

Nearest point search: For each point p in P find the closest point q on Q

Compute registration: Evaluate the rigid transform T that minimizes the sum of squared distances between pairs of closest points (p,q).

Transform: Apply the rigid transform T to all points in set P.

Iterate: Repeat step 1 to 3 until convergence.

This approach will converge to the nearest local minimum of the sum of squared distances between closest points.

The ICP convergence, however, highly depends on the initial position of the meshes. A wrong initial approximation often results in convergence to an incorrect solution. To make the ICP registration work reliably, an initial transform brings the challenge mesh close enough to the enrolled mesh to ensure convergence of the iterative closest point method to the correct solution.

This technique finds a pair of matching points on both meshes, and using a translation that brings one point to another as the initial transform. This provides a starting point that results in robust convergence of the ICP to correct registration.

Tips of the noses can be reliably detected and used as such matching points, given that the rotation angle of the head around the vertical axis with respect to the frontal position does not exceed ±30 degrees. The nose tips are detected as given above.

The initial transform is calculated as the translation that brings the tip of the nose from one mesh to the tip of the nose of the other.

Another issue that we encountered is the performance of the ICP. At each iteration of this algorithm, one needs multiple computations of either the closest or ray-mesh intersection. These are computational bottlenecks even when accelerated by volume subdivision techniques. This may require substantial amount of memory.

A version of the ICP algorithm that uses the fact that the enrolled mesh is a range map, i.e. it is projectable on the camera view plane. In this version of the ICP, first the enrolled mesh is rasterized on a regular grid in the camera view plane, and stores the z coordinates and the normals at each grid node. The regular structure of the grid ensures that the operation of projecting a point onto the grid can be done very fast. So, for each point C of the challenge mesh, the closest point on the enrolled mesh is not necessarily found, but rather the following:

1. project C onto the grid along the Z axis: C g G
2. find the plane P that is tangent to the grid and contains the projection point G
3. find the closest point $E = \text{Arg min } \{\|E-C\| \mid E \in P\}$ All these steps are very fast, since the grid has the z values and the normals cached, and computing the closest point on a plane is a simple operation.

At 325, additional features may be compared. These additional features may include any known feature which can be compared, or other additional features as disclosed herein. For example, information about the profile line in the three-dimensional mesh may be compared. The eye shape may be compared as may ear shape. The texture of the image, which may include both shape, skin irregularities such as moles or beauty marks, and color of the image may be compared. In addition, two-dimensional aspects may be compared using conventional techniques.

A measure of error is detected, and that measure of error is compared with a threshold. An example measure is the average distance between the two aligned shapes. Another is the mean error. Robust techniques may also be used which ignore outliers in the computation of the measure. That threshold may be experimentally defined; for example, it may be a threshold that defines ½% pixel errors.

An advantage of this system is, as described above, that different poses and different lighting will not create errors. Hence, the system may be as much as 100% accurate.

Although only a few embodiments have been disclosed in detail above, other modifications are possible. All such modifications are intended to be encompassed within the following claims.

The invention claimed is:

1. A method comprising:

obtaining a template representing a depth map of a known user's face, said depth map including a mask that represents part, but not all, of the users face; and comparing the template to another depth map to determine a match between the known user's face, and the another depth map, further comprising processing the template by determining a tip of the nose within the template, and using said tip of the nose of the template to find other face parts, wherein said determining a tip of the nose comprises determining an intersection between the mask and a tilted plane, wherein said tilted plane is tilted at 7 degrees.

* * * * *